C. S. LELAND.
GLAZIER'S TOOL.
APPLICATION FILED AUG. 21, 1913.

1,092,447.

Patented Apr. 7, 1914.

Witnesses
Wm H. Mulligan
Robt Meyer

Inventor
Charles S. Leland,
By Richard Dewey
his Attorney

UNITED STATES PATENT OFFICE.

CHARLES S. LELAND, OF MOUNT DESERT, MAINE.

GLAZIER'S TOOL.

1,092,447.  Specification of Letters Patent.  Patented Apr. 7, 1914.

Application filed August 21, 1913. Serial No. 786,034.

*To all whom it may concern:*

Be it known that I, CHARLES S. LELAND, a citizen of the United States, residing at Mount Desert, in the county of Hancock and State of Maine, have invented certain new and useful Improvements in Glaziers' Tools, of which the following is a specification.

This invention relates to improvements in glaziers' tools and more particularly to a combined putty knife and chisel.

The primary object of this invention is the provision of a glazier's tool which will materially decrease the amount of time necessary in setting glass; by the providing of a tool which combines a sharp implement which is necessary for the removal of the old putty and a broad flat instrument for placing the new putty, in one handle.

Another object of this invention is the provision of a tool of this nature which embodies a handle formed from a blank or a single piece of sheet metal folded and curved upon itself so as to form a simple and easily gripped handle for a tool of this nature and a handle which has means carried thereby for securely holding the blade of the tool in either of its adjusted positions.

With the foregoing and other objects in view, this invention consists in such novel features of construction, combination and arrangement of parts as will be hereinafter more fully described, illustrated in the accompanying drawings and claimed.

Figure 1:
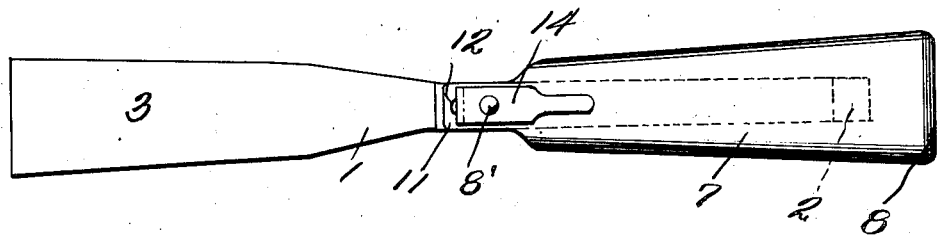
Figure 2:
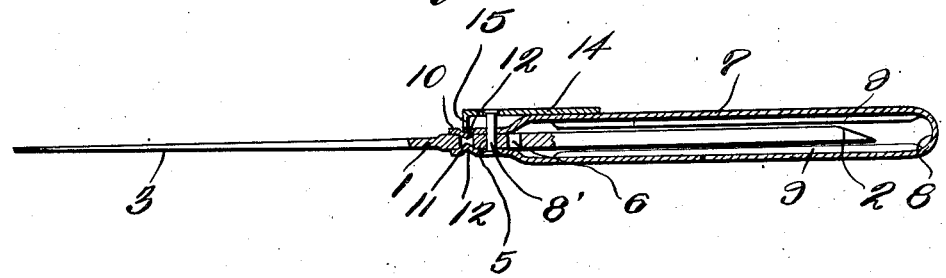
Figure 3:
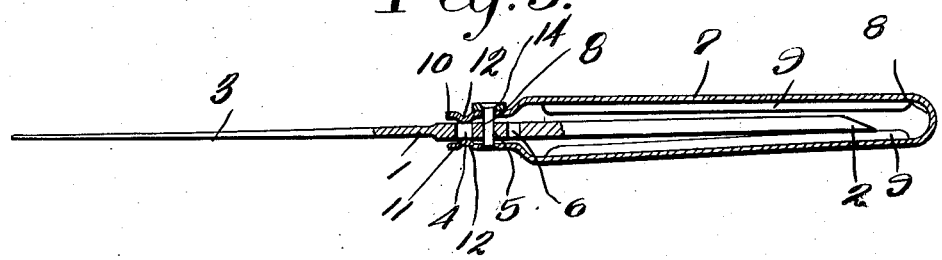

In describing this invention in detail reference will be had to the accompanying drawings wherein like characters of reference designate like or corresponding parts throughout the several views, and in which, Figure 1 is a plan view of the improved glazier's tool; Fig. 2 is a longitudinal sectional view through the tool showing the means for retaining the blade in adjusted positions in an operative position; and Fig. 3 is a sectional view similar to Fig. 2 only showing the locking means in an inoperative position.

Referring more particularly to the drawings, 1 designates the blade of the tool which has a chisel edge 2 formed upon one end of the same and a flattened blade 3, to be used for the proper placing of the new putty upon the other end. The blade 1 has openings 4, 5 and 6 extending therethrough. The opening 5 is formed substantially midway between the two ends of the blade 1 while the openings 5 and 6 are spaced equi-distant from the opening 5 and only a short distance therefrom. The blade 1 is pivotally connected to a handle 7 by means of a rivet 8' which is inserted through the opening 5 and through openings formed in one end of the handle 7. The handle 7 is formed from a single piece of sheet metal, being bent upon itself as at 8 so as to form the two sides of the handle and having its longitudinal edges curved inward as is shown at 9 in Figs. 2 and 3 of the drawings so as to prevent the edges of the handle from irritating the hand of the user. The curved longitudinal edges of the handle 7 are cut away from the bent portion 8 of the handle so as to allow the handle to be properly formed. The ends 10 and 11 of the handle 7 are reduced so as to conform to the width of the blade 1 at the portion where the blade is pivotally connected to the handle and these ends 10 and 11 have instruck portions 12 centrally located therein near the outer ends of the same. A catch 14 is pivotally mounted upon the rivet 8 and has one of its ends bent downwardly at right angles to the main body portion of the same as at 15. The end 15 engages the outer surface of the reduced end 10 of the handle and presses it toward the reduced end 11 of the handle, causing the instruck portions 12 to be seated in one of the openings 4 or 6, according to which end of the tool is in use. When the instruck portions 12 are seated in one of the openings 4 or 6 the blade 1 is firmly held in the adjusted position, having either the putty knife, which is formed by the flat blade 3 or the chisel end 2 of the blade 1 protruding beyond the handle, according to which of the tools is to be used.

When it is desired to change from one of the tools to the other all that is necessary is the moving of the catch 14 so that the end 15 will be out of engagement with the surface of the reduced end 12 of the handle 7 which will allow the instruck portions 12 to spring out of the openings 4 or 6 and allow the blade 1 to be swung about upon the rivet 18 thus changing the ends of the blade as desired. Owing to the resiliency of the spring action occasioned by the bending of the handle 7 the instruck portions 12 will immediately spring out of either of the openings 4 or 6 when the catch 14 is moved so that the end 15 will not engage the surface of the reduced end 10.

The curved longitudinal edges 9 of the handle are spaced apart so that the chisel blade may be inserted therebetween, as is shown in dotted lines in Fig. 1 of the drawings, when the putty applying blade 3 is used or vice versa, thus holding one of the ends of the blade 1 in the handle and moving it out of the way of the other blade when the tool is being used for one of its respective functions.

In practical fields certain minor features of construction, combination and arrangement of parts may necessitate alterations to which the patentee is entitled provided such alterations are comprehended within the scope of what is claimed.

What is claimed is:

In a tool, a tool blade provided with openings therein, a strip of resilient material bent substantially U-shaped to form a handle, the terminal ends of said handle having indented portions formed therein, said terminal ends being normally held out of engagement with said blade, and a catch pivotally carried by said handle for engagement with one of said terminal ends for forcing said indentations into said openings for holding said blade securely in said handle.

In testimony whereof I affix my signature in presence of two witnesses.

CHARLES S. LELAND.

Witnesses:
RICHARD O. ALLEN,
M. L. ALLEN.